United States Patent [19]

Masut

[11] Patent Number: 5,193,634
[45] Date of Patent: Mar. 16, 1993

[54] HYBRID PROPULSION SYSTEM FOR VEHICLES, IN PARTICULAR FOR ROAD VEHICLES

[75] Inventor: Lucio Masut, Bientina, Italy

[73] Assignee: Piaggio Veicoli Europei S.p.A., Milan, Italy

[21] Appl. No.: 927,714

[22] Filed: Aug. 11, 1992

Related U.S. Application Data

[63] Continuation of Ser. No. 762,656, Mar. 1, 1991, abandoned.

[30] Foreign Application Priority Data

Mar. 8, 1990 [IT]  Italy ................................ 19621 A/90

[51] Int. Cl.$^5$ ............................................ B60K 25/00
[52] U.S. Cl. ................................ 180/65.2; 74/661; 180/366
[58] Field of Search ................ 192/105 R, 105 A; 74/661, 665 A, 665 B; 474/49, 50; 180/65.1, 65.2, 65.6, 364, 366

[56] References Cited

U.S. PATENT DOCUMENTS

| | | | |
|---|---|---|---|
| 2,244,216 | 6/1941 | Pieper | 180/65.2 X |
| 3,424,261 | 1/1969 | Sheldon | 180/366 X |
| 4,400,997 | 8/1983 | Fiala | 180/65.2 X |
| 4,405,029 | 9/1983 | Hunt | 180/65.2 |
| 4,455,492 | 6/1984 | Guelpa | 180/65.2 X |
| 4,469,187 | 9/1984 | Hagin et al. | 180/14.2 |

FOREIGN PATENT DOCUMENTS

| | | |
|---|---|---|
| 0082932 | 10/1982 | European Pat. Off. . |
| 995185 | 11/1962 | United Kingdom . |
| 1440484 | 11/1973 | United Kingdom . |
| 2013149 | 1/1979 | United Kingdom . |

Primary Examiner—Margaret A. Focarino
Assistant Examiner—Michael Mar
Attorney, Agent, or Firm—Diller, Ramik & Wight

[57] ABSTRACT

In a hybrid propulsion system for vehicles in which a first propulsion unit, of internal combustion type, transmits motion to at least one wheel of the vehicle via transmission members including at least one clutch, a second propulsion unit, of electrical type, is connected to the driven element of said clutch via means such that the motion generated by one of said propulsion units when the other is deactivated is transmitted only to the transmission members located downstream of said clutch.

2 Claims, 2 Drawing Sheets

HYBRID PROPULSION SYSTEM FOR VEHICLES, IN PARTICULAR FOR ROAD VEHICLES This application is a continuation of application Ser. No. 07 762,656, filed Mar. 1, 1991 now abandoned.

BACKGROUND OF THE INVENTION

This invention relates to a hybrid propulsion system for vehicles, in particular for road vehicles.

Hybrid propulsion vehicles are, in the most general sense of the term, those vehicles equipped with more than one prime mover. Of the various possible configurations, that which has been most widespread up to the present time comprises two propulsion units, one of which is a conventional internal combustion engine and the other is an electric motor powered by a battery.

The connection scheme for the two propulsion units can be of either series or parallel type. In the series configuration, the internal combustion engine uses an alternator or in any event a rotary generator to continuously charge the battery which powers the electric motor, which alone transmits mechanical energy to the vehicle wheels.

SUMMARY OF THE INVENTION

In this case the internal combustion engine provides only the average power required for advancement, whereas the acceleration peaks are provided by the battery. The internal combustion engine can therefore be of a smaller size than that required for a similar conventional vehicle, and moreover as it works at constant speed it can operate at an optimum point, with high efficiency and low pollutant emission.

In the parallel configuration the mechanical power provided by the internal combustion engine is divided into two fractions, one fraction being absorbed by the battery charging generator and the remaining fraction being transferred directly to the drive wheels. Compared with the preceding configuration there is the advantage of greater overall efficiency as double energy conversion, i.e. from mechanical to electrical and from electrical to mechanical, is not required, as instead is required with the series configuration.

The fields of application of the two configurations differ in that whereas the first is applied when the vehicle speed requires continuous adjustment, this being easily obtainable with the electric motor, the other configuration is used when the overall energy advantages and the reliability of the propulsion system are more important.

In both these configurations the engine and motor present on the vehicle operate simultaneously. A hybrid propulsion system has also been proposed in which only one of the two propulsion units operates in determined situations, and only the other operates in the remaining situations. For example, if one of the propulsion units is electrical and the other is an internal combustion engine, the electrical propulsion could represent the only valid means in determined areas in which legislative restrictions of an ecological nature prohibit the circulation of vehicles with a conventional internal combustion engine. However if this latter is combined with an electrical propulsion unit and used as an alternative to it it provides the vehicle with sufficient independence, an independence which as is well known is relatively limited in an electrical vehicle essentially because of the still relatively primitive technology of its battery systems.

In a road vehicle, passage from one type of propulsion to the other must occur easily and with very modest means, so as not to complicate the vehicle operation and moreover not to aggravate the final cost of the system.

The object of the present invention is to provide a hybrid propulsion system for vehicles, with which the passage from one type of propulsion to the other occurs in a simple and instantaneous manner, while at the same time preventing the motion generated by one of the two propulsion units being transmitted to the other.

This object is attained by a hybrid propulsion system for vehicles, in particular for road vehicles, comprising a first propulsion unit connected to a transmission unit arranged to transmit the motion generated by said propulsion unit to at least one wheel of said vehicle, said transmission unit including at least one clutch, characterised in that a second propulsion unit is connected to a driven element of said clutch, said connection being effected by means such that the motion generated by one of said propulsion units, when the other is deactivated, is transmitted only to those members of said transmission unit located downstream of said clutch.

The advantages and characteristics of the present invention will be more apparent from the description of two embodiments thereof given hereinafter by way of example with reference to the accompanying drawings in which:

DESCRIPTION OF THE PREFERRED EMBODIMENTS

Figure 1:
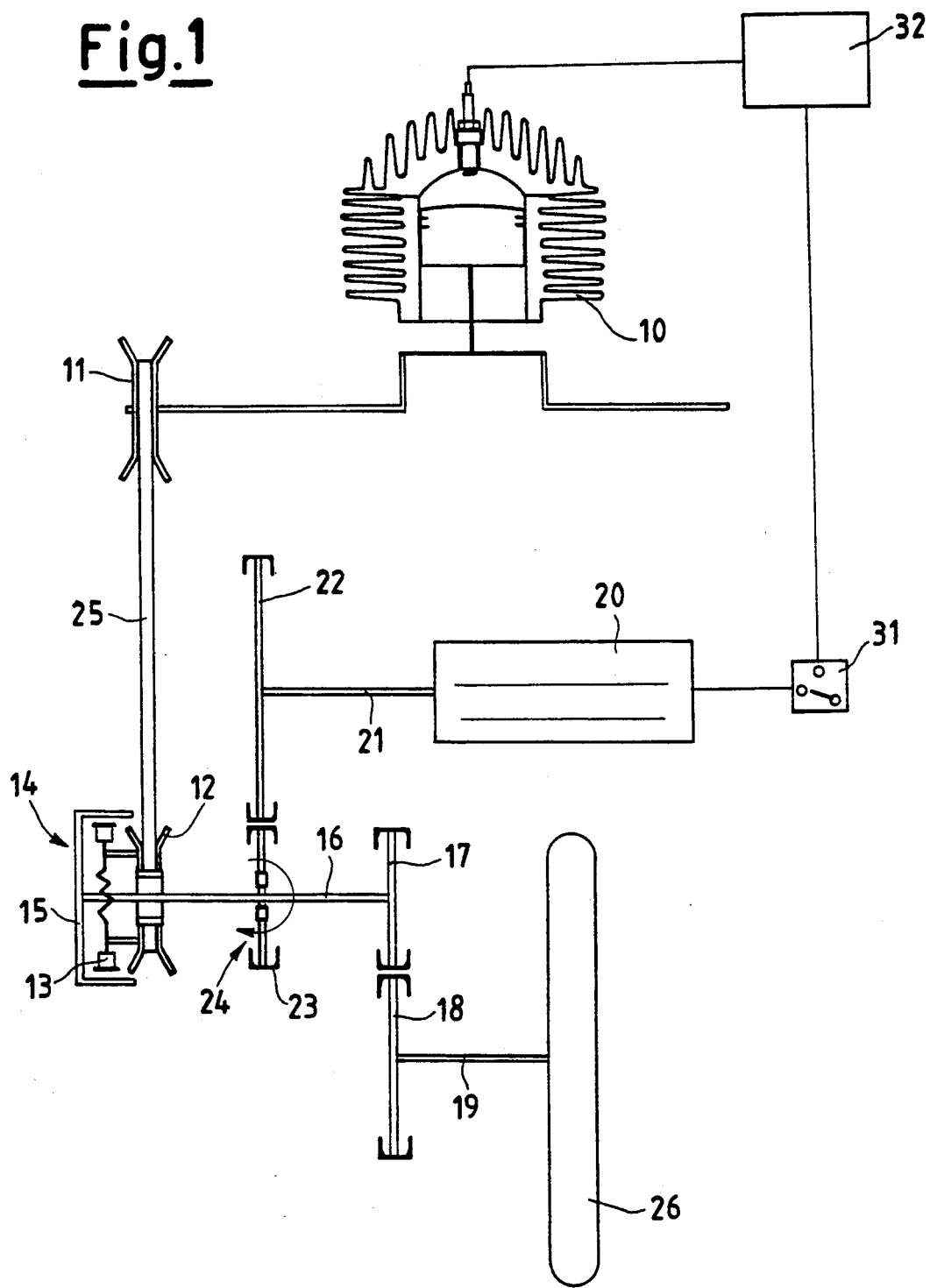
FIG. 1 is a schematic representation of a first hybrid propulsion system for a road vehicle according to the invention.

FIG. 1 shows a vehicle internal combustion engine 10 connected to an infinitely variable primary transmission pulley 11 of the frusto-conical type. The primary pulley 11 is connected by a belt 25 to a secondary transmission pulley 12. The secondary pulley 12 is connected to a centrifugal weight system 13 of an automatic engagement clutch 14. A driven element 15 of the clutch 14 is connected by the transmission shaft 16 to a reduction gear composed of a gear wheel 17 rigid with the shaft 16 and a gear wheel 18 which engages the gear wheel 17. The gear wheel 18 is connected directly to a shaft 19 which transmits motion to a vehicle wheel 26.

An electric motor 20 is connected via an output shaft 21 to a gear wheel 22 which engages a further gear wheel 23. The gear wheel 23 is connected to the shaft 16 via a free wheel 24 in such a manner as to transmit the motion generated by the electric motor 20 only if its rotational speed exceeds that of the shaft 16.

The system is such that the motion generated by one of said propulsion units, when the other is deactivated, is transmitted only to the transmission members located downstream of the automatic engagement clutch 14.

In particular, when the internal combustion engine 10 is activated, it transmits motion to the vehicle wheel 26 via the pulley 11, the belt 25, the pulley 12, the clutch 14, the transmission shaft 16, the gear wheels 17 and 18, and the shaft 19. The said connection involving the free wheel 24 prevents the motion generated by the internal combustion engine 10 being transmitted to the electric motor 20 via the pair of gear wheels 23 and 22.

When the electric motor 20 is activated, it transmits motion to the vehicle wheel 26 via the shaft 21, the gear wheels 22 and 23, the free wheel 24, the shaft 16, the gear wheels 17 and 18 and the shaft 19. In this case the shaft 16 drags with it the driven element 15 of the centrifugal clutch 14 under no load, so preventing motion being transmitted to the internal combustion engine 10.

Passage from one type of propulsion, i.e. propulsion by the internal combustion engine 10, to the other type of propulsion, i.e. propulsion by the electric motor 20, is thus effected easily and instantaneously.

Figure 2:
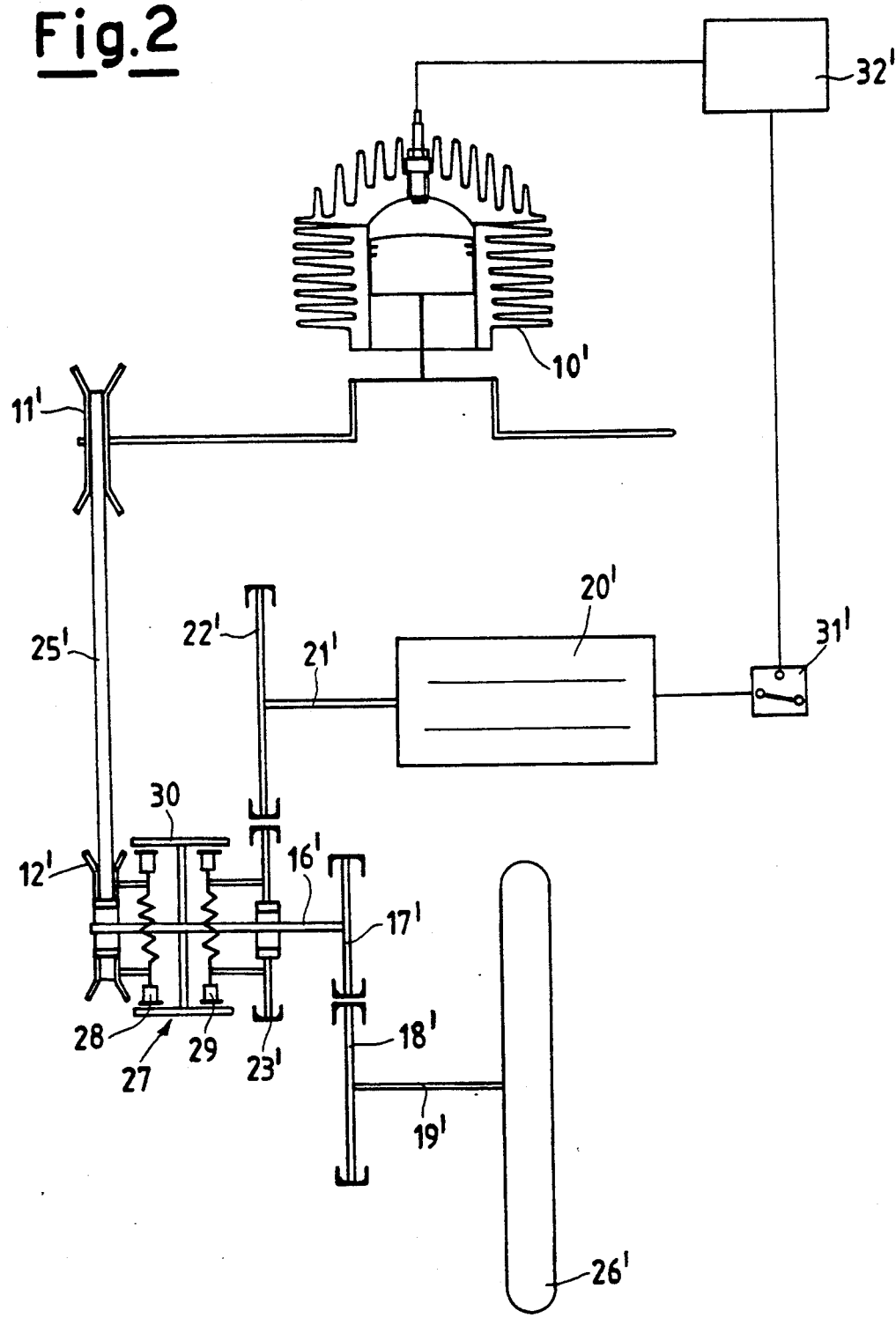
FIG. 2 is a schematic representation of a second hybrid propulsion system for a road vehicle according to the invention.

The embodiment of FIG. 2 in which the elements illustrated in FIG. 1 are indicated by the same reference numerals followed by an apex differs from the embodiment of FIG. 1 only with regard to the motion transmission from the gear wheel 23' to the transmission shaft 16'. In this respect, in this embodiment there is no longer the free wheel 24, but instead the architecture of the centrifugal clutch, here indicated by 27, is different in that it comprises two series of centrifugal weights, namely 28 connected to the secondary pulley 12' of the infinitely variable ratio transmission connected to the internal combustion engine 10', and 29 connected to the gear wheel 23' connected to the electric motor 20'. A driven element 30 of the clutch 27, this element being connected to the shaft 16', is rotated either by the motion originating from the internal combustion engine 10' or by the motion originating from the electric motor 20'. In either case the motion is transmitted only to the shaft 16' and then via the gear wheels 17', 18' and the shaft 19' to the vehicle wheel 26'. Specifically, when the internal combustion engine 10' is activated it transmits motion to the vehicle wheel 26' via the pulley 11', the belt 25', the pulley 12', the element 30 driven by the weights 28, the shaft 16', the gear wheels 17', 18' and the shaft 19'. In this situation in which the internal combustion engine 10' is activated and the electric motor 11' deactivated, the centrifugal weights 29 are at rest so that motion is not transmitted from the former to the latter.

When the electric motor 20' is activated it transmits motion to the vehicle wheel 26' via the shaft 21', the gear wheels 22', 23', the element 30 driven by the weights 29, the shaft 16', the gear wheels 17', 18' and the shaft 19'. In this situation the weights 28 are at rest as the internal combustion engine 10' is inactive, with the result that motion is not transmitted from the electric motor 20' to the internal combustion engine 10'.

The propulsion system of FIG. 2 is therefore also such that the motion generated by one of said propulsion units, when the other is deactivated, is transmitted only to those transmission members located downstream of the automatic engagement clutch 27. Again in this case, passage from one type of propulsion to the other is effected easily and instantaneously.

Both in the embodiment of FIG. 1 and in the embodiment of FIG. 2 protection devices are provided to prevent the two propulsion units being inadvertently activated simultaneously. For example, the electric motor can be powered simply by operating a two-way switch indicated by 31 in FIG. 1 and by 31' in FIG. 2, thus breaking an electrical ignition circuit indicated by 32 in FIG. 1 and by 32' in FIG. 2, which ignites the mixture in the internal combustion engine.

As an alternative to that shown, the internal combustion engine could be connected to the vehicle wheel via a manually operated clutch which can be locked in the disengaged position by any means for locking the clutch operating member. The electric motor can be connected to a transmission shaft rigid with the clutch driven element downstream of the clutch via a free wheel or to an automatic engagement clutch of the aforesaid type.

The described hybrid propulsion systems can be applied to any type of vehicle and can drive one or more wheels of the vehicle.

I claim:

1. A hybrid propulsion system for vehicles comprising a vehicle having a drive wheel, a first propulsion unit for generating motion which is adapted to be transmitted to said drive wheel, said first propulsion unit being an internal combustion engine, a second propulsion unit for generating motion which is adapted to be transmitted to said drive wheel, said second propulsion unit being a battery powered electric motor, means for preventing the simultaneous operation of said internal combustion engine and said battery powered electric motor, first transmission means for transmitting motion generated by said internal combustion engine to said drive wheel, second transmission means for transmitting motion generated by said battery powered electric motor to said drive wheel; said first transmission means including a variable speed transmission defined by first and second frusto-conical pulleys and a pulley belt entrained thereabout, said first pulley being driven by said internal combustion engine, automatic engagement centrifugal clutch means associated with said second pulley for imparting rotation to an associated transmission shaft, said automatic engagement centrifugal clutch means includes centrifugal weights carried by said second pulley for effecting driving engagement with a driven element of said automatic engagement centrifugal clutch means which is in turn carried by said transmission shaft, a pair of meshed gear wheels between said transmission shaft and a shaft of said drive wheel; and said second transmission means including a first gear wheel driven by an output shaft of said battery powered electric motor in mesh with a second gear wheel which is in turn connected by a free wheel to said transmission shaft whereby motion will be imparted to said transmission shaft from said battery powered electric motor only if the speed of its said output shaft exceeds the speed of said transmission shaft.

2. A hybrid propulsion system for vehicles comprising a vehicle having a drive wheel, a first propulsion unit for generating motion which is adapted to be transmitted to said drive wheel, said first propulsion unit being an internal combustion engine, a second propulsion unit for generating motion which is adapted to be transmitted to said drive wheel, said second propulsion unit being a battery powered electric motor, means for preventing the simultaneous operation of said internal combustion engine and said battery powered electric motor, first transmission means for transmitting motion generated by said internal combustion engine to said drive wheel, second transmission means for transmitting motion generated by said battery powered electric motor to said drive wheel; said first transmission means including a variable speed transmission defined by first and second frusto-conical pulleys and a pulley belt entrained thereabout, said first pulley being driven by said internal combustion engine, automatic engagement centrifugal clutch means associated with said second pulley for imparting rotation to an associated transmission shaft, said automatic engagement centrifugal clutch means including first and second centrifugal weights adapted to effect driving engagement with a driven element of said automatic engagement centrifugal clutch means, a pair of meshed gear wheels between said transmission shaft and a shaft of said drive wheel; said second transmission means including a first gear wheel driven by an output shaft of said battery powered electric motor in mesh with a second gear wheel, said first centrifugal weights being carried by said second pulley to transfer rotation from said second pulley to said driven element, and said second centrifugal weights being carried by said second gear wheel to thereby transfer rotation from said driven element to said vehicle wheels via said pair of meshed gear wheels.

* * * * *